US007779142B1

(12) United States Patent  (10) Patent No.: US 7,779,142 B1
Greene et al.  (45) Date of Patent: Aug. 17, 2010

(54) BANDWIDTH ALLOCATION TO SUPPORT FAST BUFFERING

(75) Inventors: Spencer Greene, Palo Alto, CA (US); Robert Dykes, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 663 days.

(21) Appl. No.: 11/626,016

(22) Filed: Jan. 23, 2007

(51) Int. Cl.
  *G06F 15/16* (2006.01)
  *H04L 12/26* (2006.01)
(52) U.S. Cl. .................. 709/232; 709/231; 370/235
(58) Field of Classification Search ........... 709/230, 709/231, 232; 370/335, 412, 468
  See application file for complete search history.

(56) References Cited

U.S. PATENT DOCUMENTS

| 7,373,413 | B1* | 5/2008 | Nguyen et al. ............. 709/231 |
| 2004/0179497 | A1* | 9/2004 | Foore et al. ................. 370/335 |
| 2005/0254427 | A1* | 11/2005 | Leon et al. .................. 370/235 |
| 2005/0286856 | A1* | 12/2005 | Aerts ........................... 386/46 |
| 2006/0095472 | A1* | 5/2006 | Krikorian et al. ......... 707/104.1 |
| 2006/0268704 | A1* | 11/2006 | Ansari et al. ................ 370/230 |
| 2007/0097816 | A1* | 5/2007 | Van Gassel ............. 369/47.33 |

* cited by examiner

*Primary Examiner*—Joseph E Avellino
*Assistant Examiner*—Peter Shaw
(74) *Attorney, Agent, or Firm*—Harrity & Harrity, LLP

(57) ABSTRACT

A system delivers a media stream to a client using a delivery bandwidth. The system adjusts an amount of the bandwidth used to deliver the media stream based on a state of a buffer associated with the client that receives and buffers the delivered media stream.

19 Claims, 11 Drawing Sheets

BANDWIDTH ALLOCATION TO SUPPORT FAST BUFFERING

BACKGROUND

Streaming media typically includes audio and/or video transmitted over networks, such as, for example, the Internet, in a streaming or continuous fashion. In streaming media applications, streaming audio and/or video data may be played back without the data being completely downloaded first. Streaming media may, thus, be viewed or listened to in "real-time" as the data is received. Streaming media may be user-controlled (e.g., on-demand, pay-per-view movies, etc.) or server-controlled (e.g., webcasting).

There are several network-based streaming services including, for example, audio streaming and video-on-demand (cable, Internet Protocol Television (IPTV)). Audio streaming (voice or music) may include the distribution of voice or music containing media over the Internet for user listening. Video-on-demand (VOD) allows users to select and watch video content over a network as part of an interactive television system. VOD systems may stream content allowing viewing while the video is being downloaded.

Networks, such as Internet Protocol (IP) networks, carry bursty traffic and can experience occasional periods of congestion, loss or high latency. When delivering rich media, such as, for example, streaming media including audio and/or video over an IP network, it is common to provide buffering at the receiver end of the communication. As long as average bandwidth delivery is sufficient to support the media stream and instantaneous degradations are shorter in duration than the amount of play time held in the buffer, the media can be played without interruption. A drawback with existing streaming media playback systems is that when initiating a media stream (e.g., at channel change time), the buffer must fill before media playback begins. Therefore, there is a tradeoff between better robustness to instantaneous network degradation (i.e., achieved by buffering for a longer time period) versus faster channel change (i.e., achieved by buffering a shorter time period).

SUMMARY

In accordance with one implementation, a method may include delivering a media stream to a client using a delivery bandwidth. The method may further include adjusting an amount of the bandwidth used to deliver the media stream based on a state of a buffer associated with the client that receives and buffers the delivered media stream.

In another implementation, a media server may include a communication interface that delivers a media stream to a client across a network using a delivery bandwidth. The media server may further include a processing unit that adjusts an amount of the bandwidth used to deliver the media stream based on a state of a buffer associated with the client that receives and buffers the delivered media stream.

In still another implementation, a method may include requesting delivery of a media stream from a media server for a period of time sufficient to fill a buffer. The method may further include receiving a first portion of the media stream over a first bandwidth for the period of time and receiving a second portion of the media stream over a second bandwidth after expiration of the period of time, wherein the second bandwidth is different than the first bandwidth.

In yet another implementation, a method may include reserving a portion of a network bandwidth to divide the network bandwidth into a reserved network bandwidth and an unreserved network bandwidth and receiving a request for media delivery from a client. The method may further include transmitting the media via a first bandwidth portion of the reserved network bandwidth for a time period that is based on an amount of time to fill a buffer at the client and transmitting the media via a second bandwidth portion of the unreserved network bandwidth after expiration of the time period, wherein the second bandwidth portion comprises less bandwidth than the first bandwidth portion.

In a further implementation, a method may include setting a first buffer size for buffering a first portion of a media stream delivered according to a first network service level agreement. The method further includes setting a second buffer size for buffering a second portion of the media stream delivered according to a second network service level agreement, wherein the first network service level agreement comprises a better service quality than the second network service level agreement and wherein the first buffer size is smaller than the second buffer size.

In an additional implementation, a method may include determining a period of time to sufficiently fill a client buffer that buffers a media stream and delivering a first portion of the media stream to the client using a first bandwidth during the period of time. The method may further include delivering a second portion of the media stream to the client using a second bandwidth subsequent to expiration of the period of time, wherein the first bandwidth is different than the second bandwidth.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments implement mechanisms that permit streaming media buffering to occur quickly at clients that receive and playback streaming media. During the initiation of a media stream (e.g., at channel change) or during buffer underflow events, a better network service level agreement (SLA), that permits media delivery at a higher rate or with less variability, may be allocated to a connection between a media delivery server and the receiving client. For example, if the better SLA includes a higher bandwidth, the higher network bandwidth allocation may persist for an adequate period of time to permit the receiving buffer at the client to buffer a sufficient amount of the streaming media data. Once this period of time has elapsed, the higher network bandwidth may be de-allocated and media delivery may continue with a lower network bandwidth, lower delivery rate connection between the media server and client. Exemplary embodiments, thus, permit the temporary allocation of a higher network bandwidth for quick media buffering at a media playback system.

Overview

Figure 1:
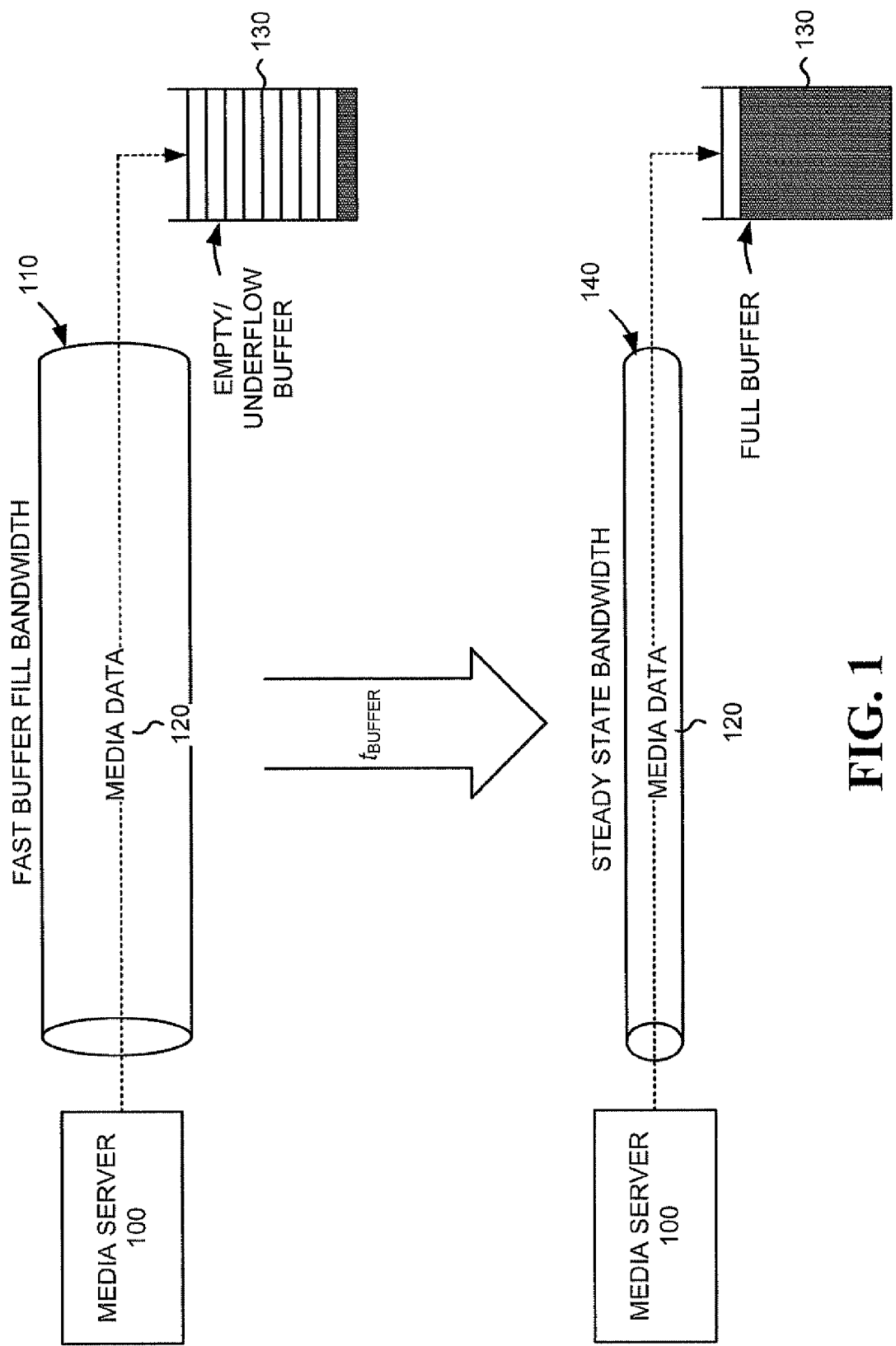
FIG. 1 is a diagram of an overview of an exemplary embodiment described herein.

FIG. 1 illustrates an exemplary overview of an implementation described herein. As shown in FIG. 1, a media server 100 may transmit media data 120 using a high bandwidth 110, identified in FIG. 1 as a "fast buffer fill bandwidth," to fill a buffer 130 at a client that is either empty or experiencing a buffer underflow condition. Buffer 130 may be empty because the stream of media data 120 has just been initiated (e.g., at channel change), or because the stream of media data 120 has been interrupted or sufficiently delayed such that buffer 130 does not contain enough media data to continue media playback (e.g., a buffer underflow event).

After a sufficient period of time ($t_{BUFFER}$) to adequately fill buffer 130 with media data 120 has elapsed, media server 100 may begin transmitting the remaining media data 120 of the stream using a "steady state" bandwidth 140, which includes less bandwidth than fast buffer fill bandwidth 110.

Exemplary Network

Figure 2:
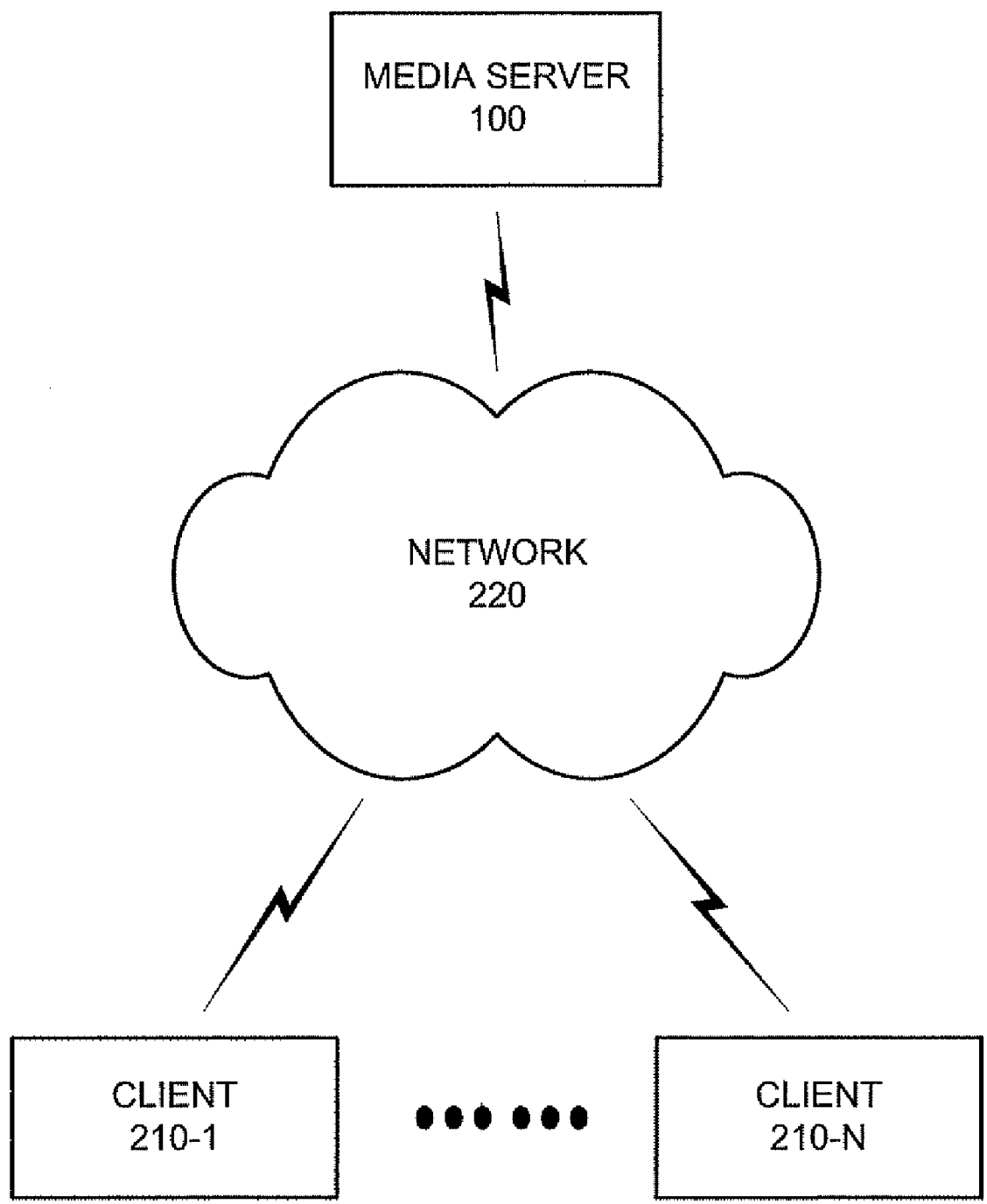
FIG. 2 is a diagram of an exemplary network in which systems and methods may be implemented.

FIG. 2 is a diagram of an exemplary network 200 in which systems and methods described herein may be implemented. Network 200 may include a media server 100 connected to one or more clients 210-1 through 210-N via a sub-network 220. Media server 100 and clients 210-1 through 210-N may connect with sub-network 220 via any type of link, such as, for example, wired or wireless links. Sub-network 220 can include one or more networks of any type, including a Public Land Mobile Network (PLMN), a digital subscriber line (DSL) network, a Public Switched Telephone Network (PSTN), a local area network (LAN), a metropolitan area network (MAN), a wide area network (WAN), an optical fiber network, a hybrid optical fiber/coaxial (HFC) cable network, the Internet, or Intranet. The one or more networks may alternatively include packet-switched sub-networks, such as, for example, General Packet Radio Service (GPRS), Cellular Digital Packet Data (CDPD), and Mobile IP sub-networks. In an implementation in which sub-network 220 includes a HFC cable network, media server 110 may connect to a head end of the HFC cable network. In an implementation in which sub-network 220 includes a DSL network, media server 110 may connect (i.e., indirectly) to a digital subscriber line access multiplexer (DSLAM) of the DSL network.

Media server 100 may include any type of entity that delivers media data (e.g., streaming media) to respective clients 210. Each of clients 210-1 through 210-N may include a device capable of receiving one or more streams of media data transmitted from media server 100, buffering the one or more streams of media data, and playing back the one or more streams using a media player. Each of clients 210-1 through 210-N may include, for example, a personal computer, a television, a telephone, a cellular radiotelephone, a Personal Communications System (PCS) terminal, a personal digital assistant (PDA), a laptop and/or palmtop. A PCS terminal may combine a cellular radiotelephone with data processing, facsimile and/or data communications capabilities.

It will be appreciated that the number of components illustrated in FIG. 2 is provided for explanatory purposes only. A typical network may include more or fewer components than are illustrated in FIG. 2.

Figure 3:
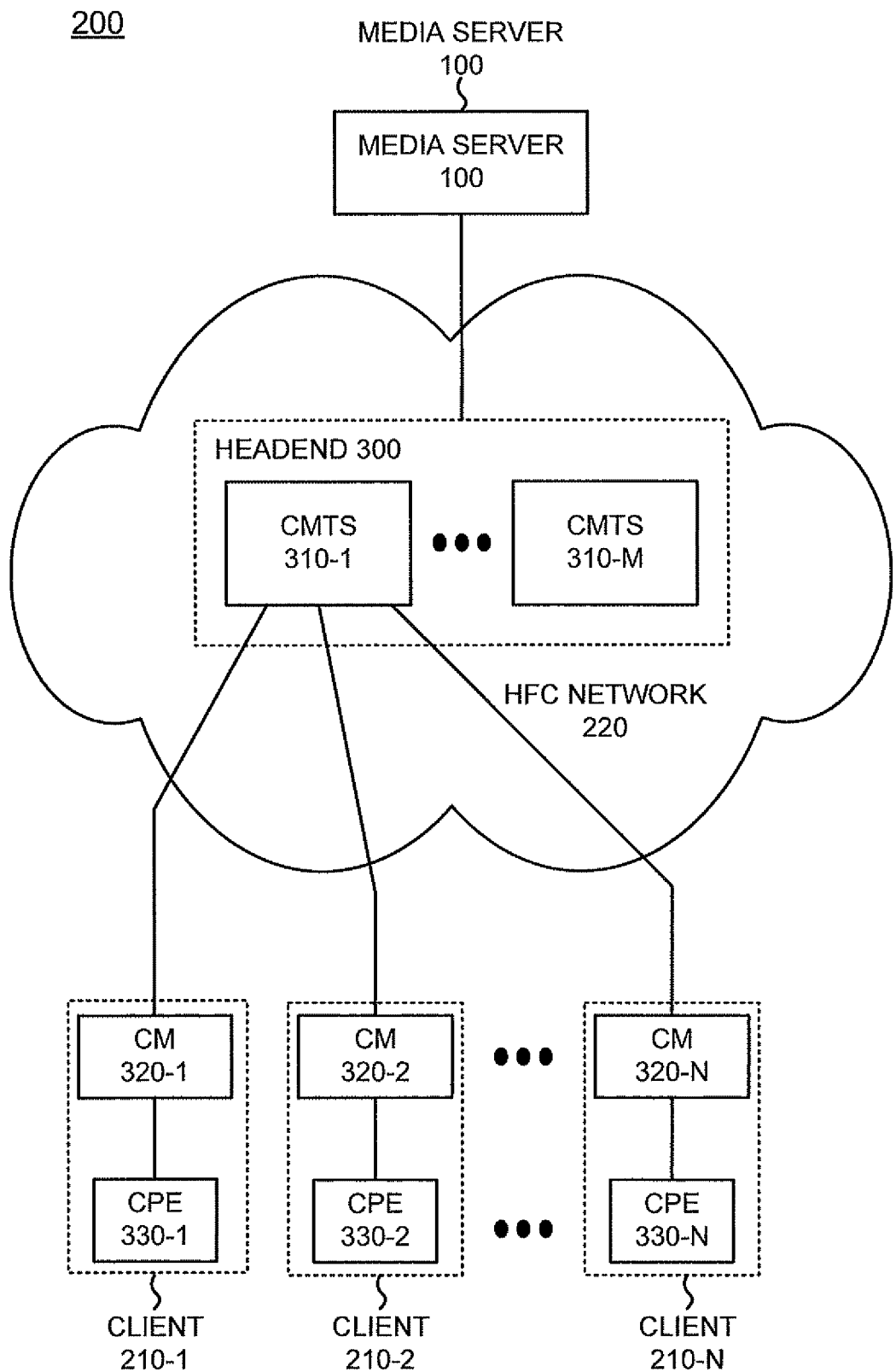
FIG. 3 is a diagram illustrating an exemplary embodiment in which a sub-network of the network of FIG. 2 includes a hybrid optical fiber/coaxial (HFC) cable network.

FIG. 3 illustrates an exemplary embodiment in which sub-network 220 includes an HFC network. In the exemplary embodiment of FIG. 3, media server 100 may connect to a cable head end 300 of the HFC network and may include one or more cable modem termination systems (CMTSs) 310-1 through 310-M. Each of CMTSs 310-1 through 310-M may connect to one or more clients 210 via, for example, coaxial cable. As shown in FIG. 3, CMTS 310-2 may connect to clients 210-1 through 210-N. Each of CMTSs 310-1 through 310-M may transmit media data on downstream channels via, for example, the coaxial cable.

As further illustrated in FIG. 3, each of clients 210-1 through 210-N may include a respective cable modem 320 and/or other customer premises equipment (CPE) 330. Each cable modem 320 may receive a downstream media data transmission from a respective CMTS 310 and pass the demodulated transmission on to a respective CPE 330. Each CPE 330 may include, for example, a personal computer, a television, a laptop or the like.

Figure 4:
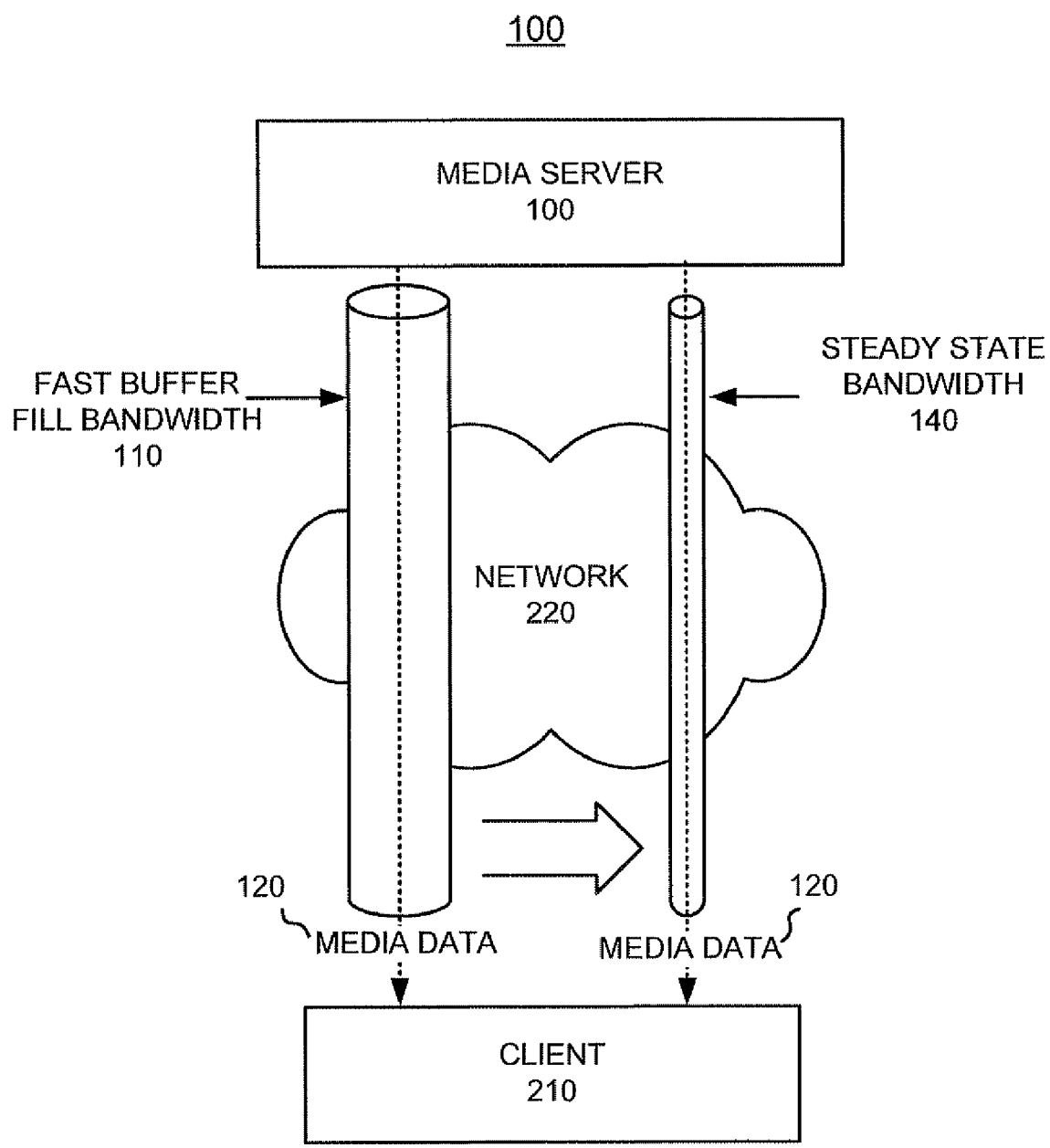
FIG. 4 graphically depicts the transmission of streaming media between the media server and a client of FIG. 2 via a fast buffer fill bandwidth or a steady state bandwidth.

FIG. 4 graphically illustrates the transmission of media data 120 of a media stream from media server 100 to a client 210 using, alternatively, either fast buffer fill bandwidth 110 or steady state bandwidth 140. A fraction of the capacity of sub-network 220 (or at least the portions of sub-network 220 that are the most constrained) may be reserved such that one or more "channels" of fast buffer fill bandwidth 110 are available for use on-demand, with the remainder of the capacity of sub-network 220 being available for one or more "channels" of steady state bandwidth 140. For example, if sub-network 220 has a 100 stream capacity, 10 streams of the stream capacity may be reserved for fast buffer fill use. The remaining 90 streams of the stream capacity may be used for steady state use. In some implementations, media data 120 sent via fast buffer fill bandwidth 110 may have a higher designated priority or quality of service than media data 120 sent via steady state bandwidth 140 so that the media data 120 sent via fast buffer fill bandwidth 110 is less likely to be interrupted by congestion, loss or latency.

When client 210 needs to buffer data of the media stream (e.g., when the media stream is first initiated, or when a buffer underflow event occurs during transmission of the media stream), media server 100 may transmit a portion of the media data 120 of the media stream at a higher rate via a high bandwidth (e.g., via fast buffer fill bandwidth 110) of sub-network 220. After a period of time sufficient to fill a buffer at client 210, media server 100 may transmit a remaining portion of the media data 120 of the media stream at a lower rate via steady state bandwidth 140, where steady state bandwidth 140 has a lower bandwidth than fast buffer fill bandwidth 110. Use of fast buffer fill bandwidth 110, thus, enables client 210 to quickly buffer media data of the media stream, thereby, reducing interruptions in playback of the media stream at client 210.

Exemplary Client

Figure 5:
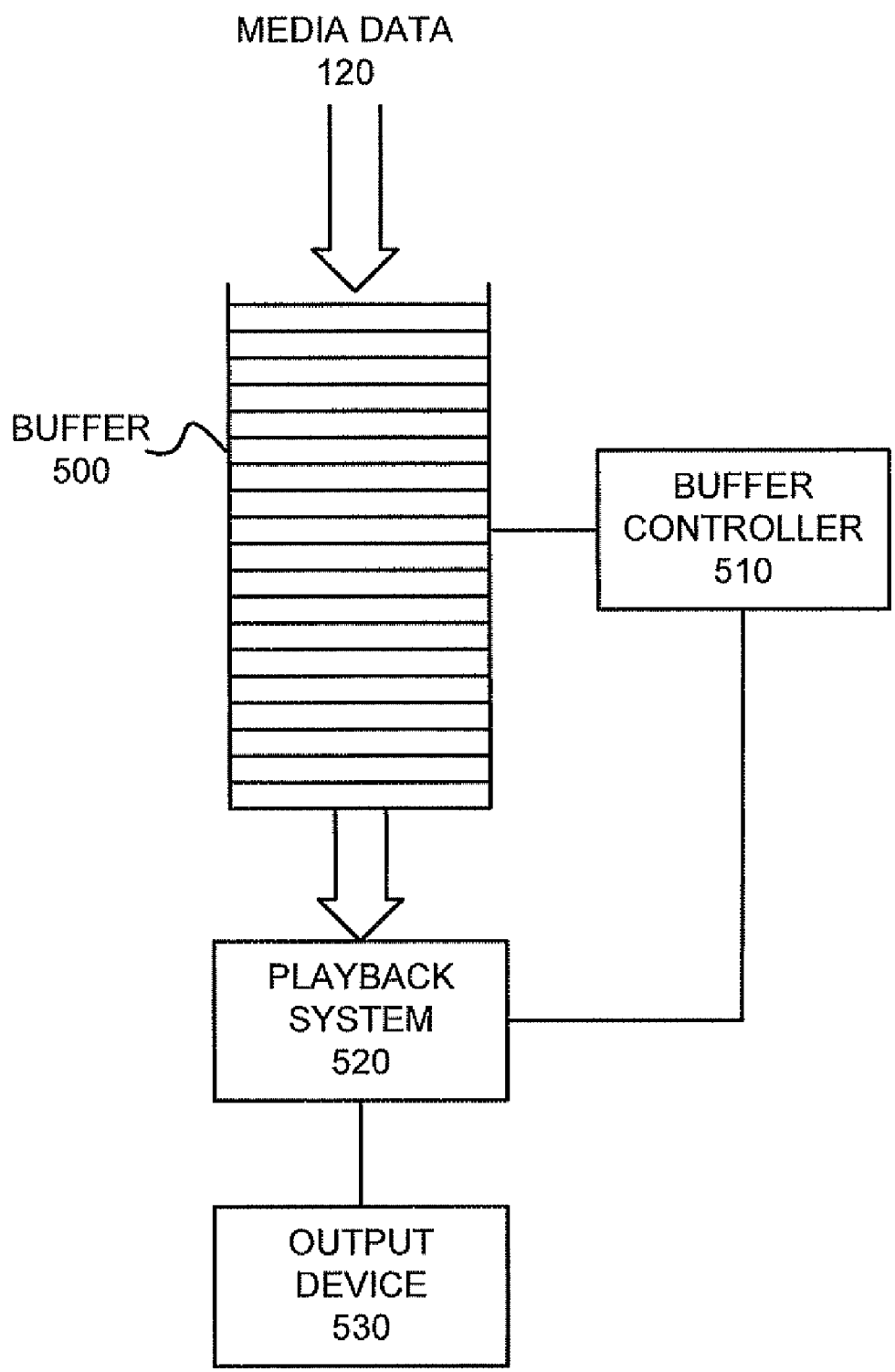
FIG. 5 is a exemplary diagram of a client of FIG. 2.

FIG. 5 is a diagram of a portion of client 210 according to an exemplary implementation. Client 210 may include a buffer 500, a buffer controller 510, a playback system 520 and an output device 530. In some implementations, buffer 500 may be implemented by a memory device (not shown), and buffer controller 510 and playback system 520 may be implemented by a processing unit (not shown), such as, for example, a microprocessor.

Buffer 500 may receive and store streaming media data 120 received from media server 100. Buffer controller 510 may control the sequential storage of streaming media data 120 in buffer 500, and retrieval of media data 120 from buffer 500 for playback by playback system 520. Playback system 520 may receive data retrieved from buffer 500 by buffer controller 510, and may play the streaming media data 120 to a listener or viewer via output device 530. For example, playback system 520 may decode the data from buffer 500 before using output device 530 to convert the decoded data from an electrical signal to an auditory output signal. As another example, playback system 520 may decode the data from buffer 500 before using output device 530 to convert the video data to a visual representation on a visual display unit. Playback system 520 may simultaneously convert audio and video data from media data 120 to an auditory output signal and a visual representation on a visual display unit.

Exemplary Media Server

Figure 6:
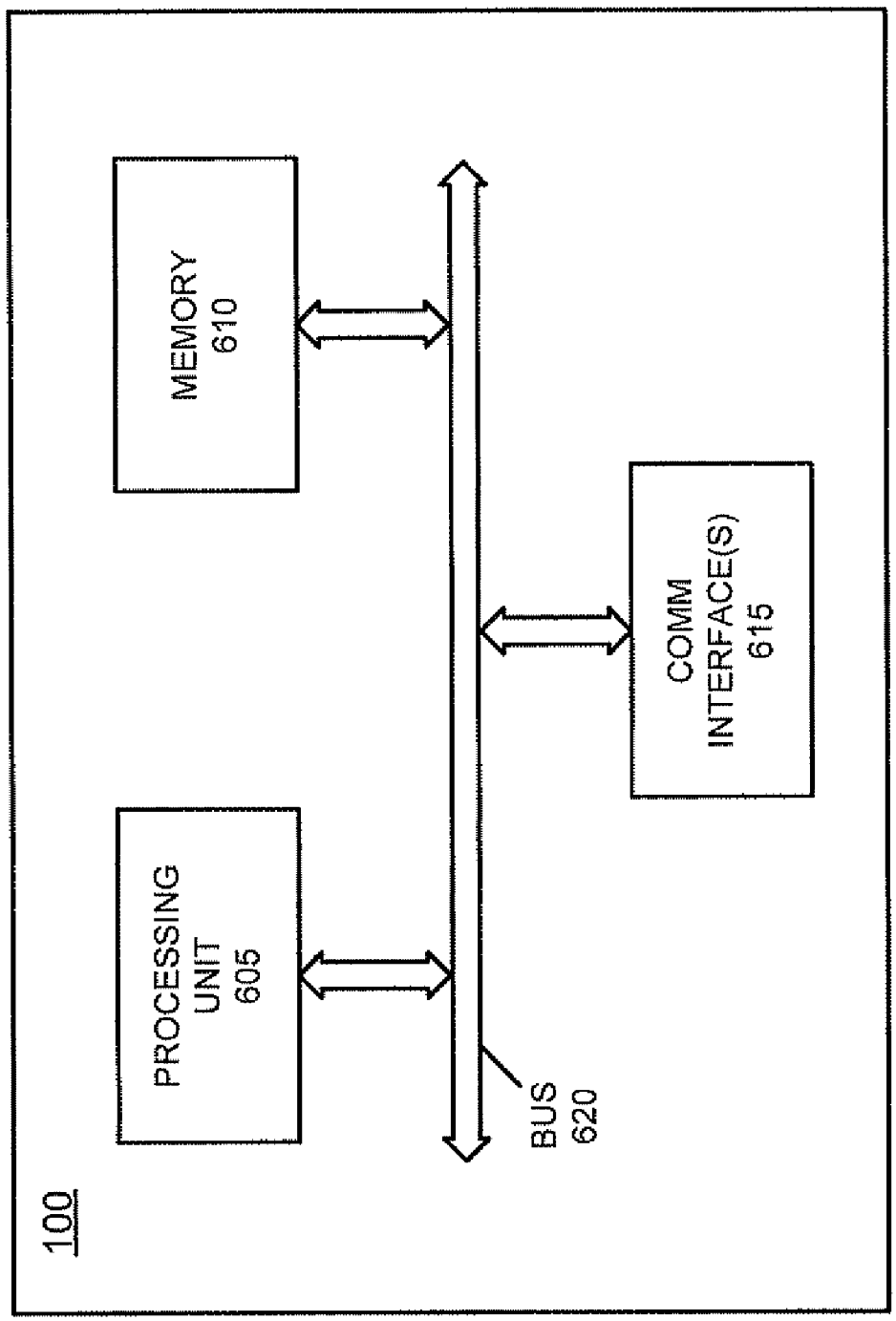
FIG. 6 is a exemplary diagram of the media server of FIG. 2.

FIG. 6 illustrates a diagram of a portion of a media server 100 according to an exemplary embodiment. Media server 100 may include a processing unit 605, a memory 610 (or other storage), a communication interface(s) 615 and a bus 620. Processing unit 605 may include a processor, microprocessor or processing logic. Processing unit 605 may perform data processing functions for data (e.g., media data) transmitted/received via communication interface 615. Memory 610 may include Random Access Memory (RAM) that provides temporary working storage of data and instructions for use by processing unit 605 in performing control and processing functions. Memory 610 may additionally include Read Only Memory (ROM) that provides permanent or semi-permanent storage of data and instructions for use by processing unit 605. Memory 610 can also include large-capacity storage devices, such as a magnetic and/or optical recording medium and its corresponding drive.

Communication interface 615 may include known circuitry for transmitting data to, or receiving data from, subnetwork 220. Such circuitry may include modulators/demodulators, amplifiers, filters, interleavers, error correction circuitry, and/or other known circuitry used for network communication. Bus 620 interconnects the various components of media server 100 to permit the components to communicate with one another.

Exemplary Client-Side Process

Figure 7A:
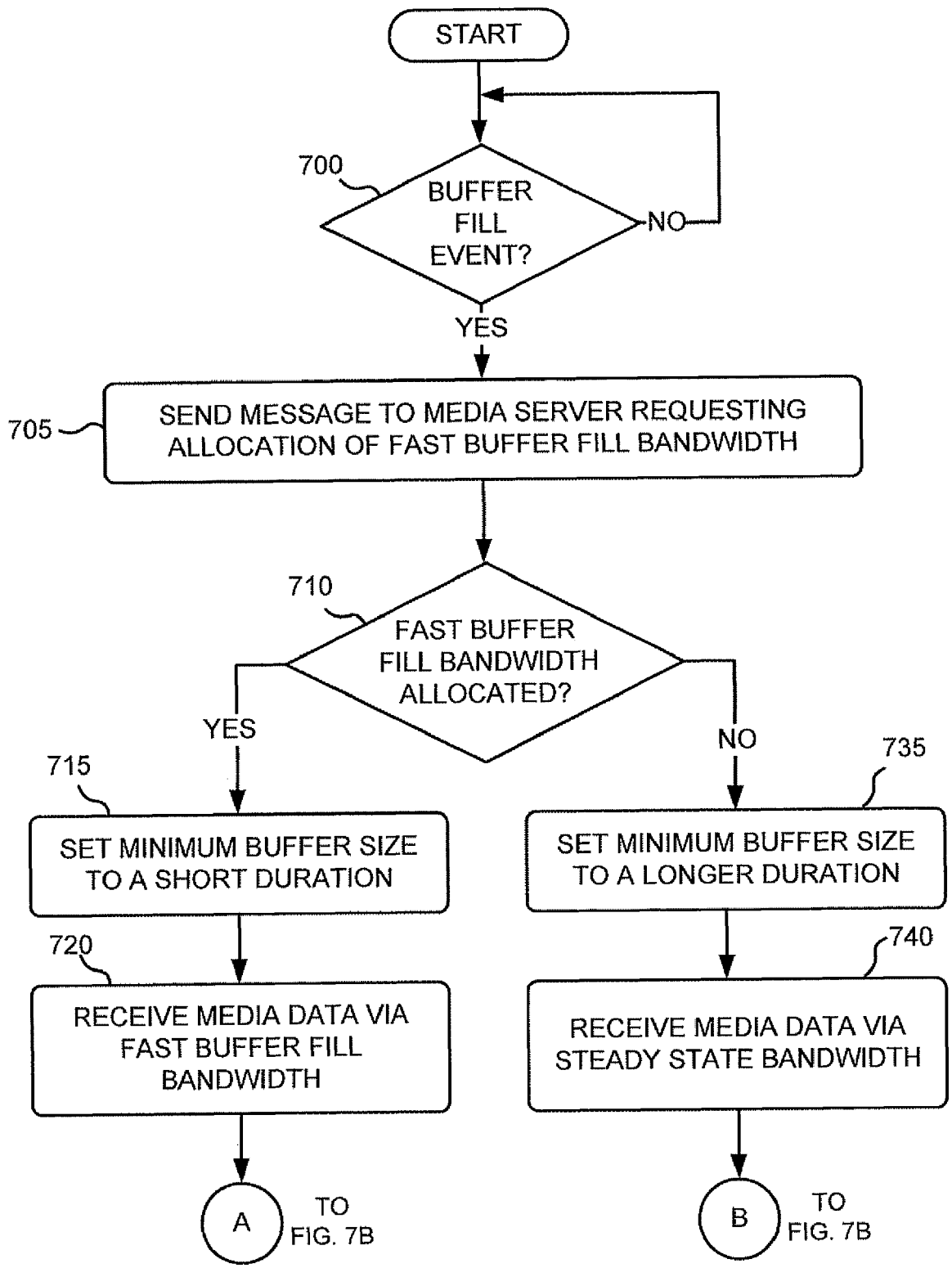
FIGS. 7A and 7B are flow charts that illustrate an exemplary process for buffering media data received via a fast buffer fill bandwidth and a steady state bandwidth.
Figure 7B:
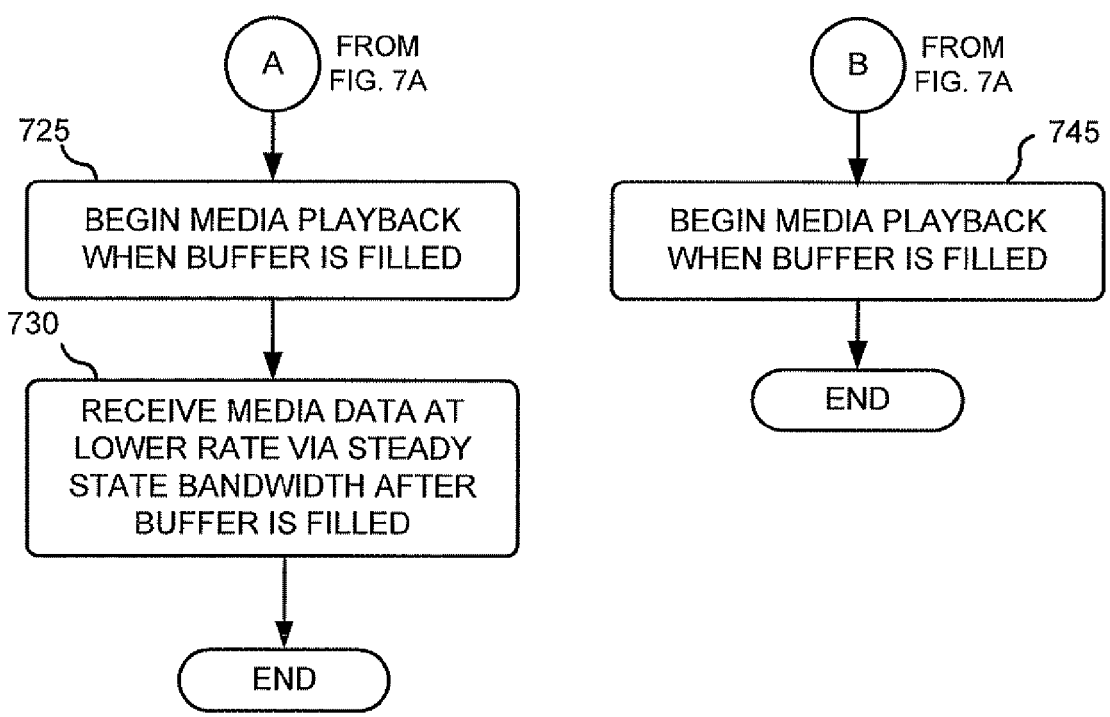

FIGS. 7A and 7B are a flowchart of a process for buffering media data 120 received via a fast buffer fill bandwidth 110 and a steady state bandwidth 140 according to an exemplary implementation. A client 210 may implement the process exemplified by FIGS. 7A and 7B.

The exemplary process may begin with client 210 determining whether a buffer fill event has occurred, or is going to occur (block 700). A "buffer fill event" may occur at the initiation of the transmission of streaming media data 120 from media server 100 to client 210. When the transmission of streaming media data 120 is first initiated, buffer 500 may initially need to buffer an amount of media data 120. The "buffer fill event" may also include the circumstance where the stream of media data 120 being received at client 210 is interrupted or sufficiently delayed such that buffer 500 does not contain enough media data to continue media playback (e.g., a buffer underflow event).

Figure 8:
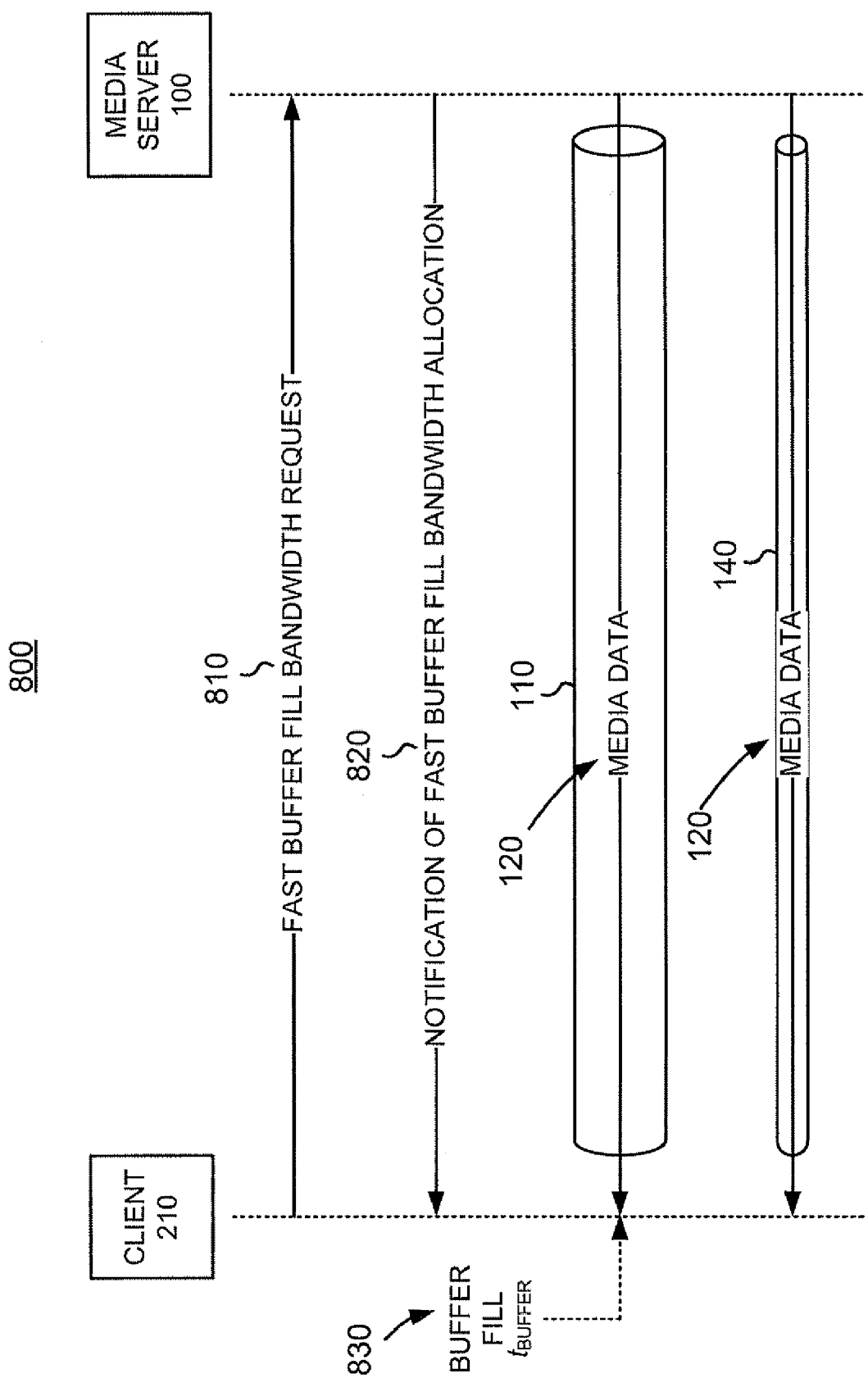
FIG. 8 is a messaging diagram that depicts messages and data transmitted between the media server and a client of FIG. 2.

Client 210 may send a message to media server 100 requesting allocation of fast buffer fill bandwidth 110 (block 705). The message from client 210 may include an indication of a specified duration ($t_{BUFFER}$) of time over which the fast buffer fill bandwidth 110 is requested. The message from client 210 may alternatively identify an amount of data that needs to be transmitted via fast buffer fill bandwidth 110. Alternatively, the amount of data that needs to be transmitted via fast buffer fill bandwidth 110 may be a configured parameter at media server 100, or may be computed by media server 100. As graphically depicted in the messaging diagram of FIG. 8, client 210 may send a fast buffer fill bandwidth request 810 to media server 100. Client 210 may determine whether fast buffer fill bandwidth 110 has been allocated (block 710). As shown in FIG. 8, media server 100, or other network element, may notify client 210 of the allocation of fast buffer fill bandwidth 110 by returning a notification message 820 to client 210.

If fast buffer fill bandwidth 110 has been allocated to client 210 (YES—block 710), then buffer controller 510 may set a minimum buffer size of buffer 500 to a short duration (block 715). The short duration of the minimum buffer size of buffer 500 may be based on an amount of bandwidth (or variability thereof) of fast buffer fill bandwidth 110 allocated to client 210 and, thus, based on the rate that media data 120 is transmitted to client 210. Client 210 may then receive media data 120 from media server 100 via fast buffer fill bandwidth 110 (block 720). FIG. 8 graphically depicts client 210 receiving media data 120 from media server 100 via fast buffer fill bandwidth 110 over a buffer fill 830 period of time (e.g., $t_{BUFFER}$).

Playback system 520 of client 210 may begin playback of the received media data when buffer 500 is sufficiently filled (block 725). Once buffer 500 has buffered a sufficient quantity of media data 120 to reduce chances that playback of media data 120 will be interrupted, playback system 520 may begin playback of the stream of media data 120. After buffer 500 is sufficiently filled with media data received via fast buffer fill bandwidth 110, client 210 may receive additional media data 120 of the stream at a lower rate via steady state bandwidth 140 (block 730). FIG. 8 graphically depicts client 210 receiving media data 120 at a lower rate via steady state bandwidth 140 from media server 100.

Returning to block 710, if client 210 receives an indication from media server 100 that fast buffer fill bandwidth 110 has not been allocated to client 210 (NO—block 710), then buffer controller 510 of client 210 may set a minimum buffer size of buffer 500 to a longer duration (block 735). Client 210 may receive a message from media server 100 denying allocation of fast buffer fill bandwidth 110. The longer duration of minimum buffer size of buffer 500 may be based on the lower bandwidth or higher variability of steady state bandwidth 140 and, thus, the lower rate that media data is transmitted to client 210.

Client 210 may then receive media data 120 via steady state bandwidth 140 (block 740). Playback system 520 of client 210 may begin media playback of media data 120 when buffer 500 is sufficiently filled (block 745).

Exemplary Media Server-Side Process

Figure 9A:
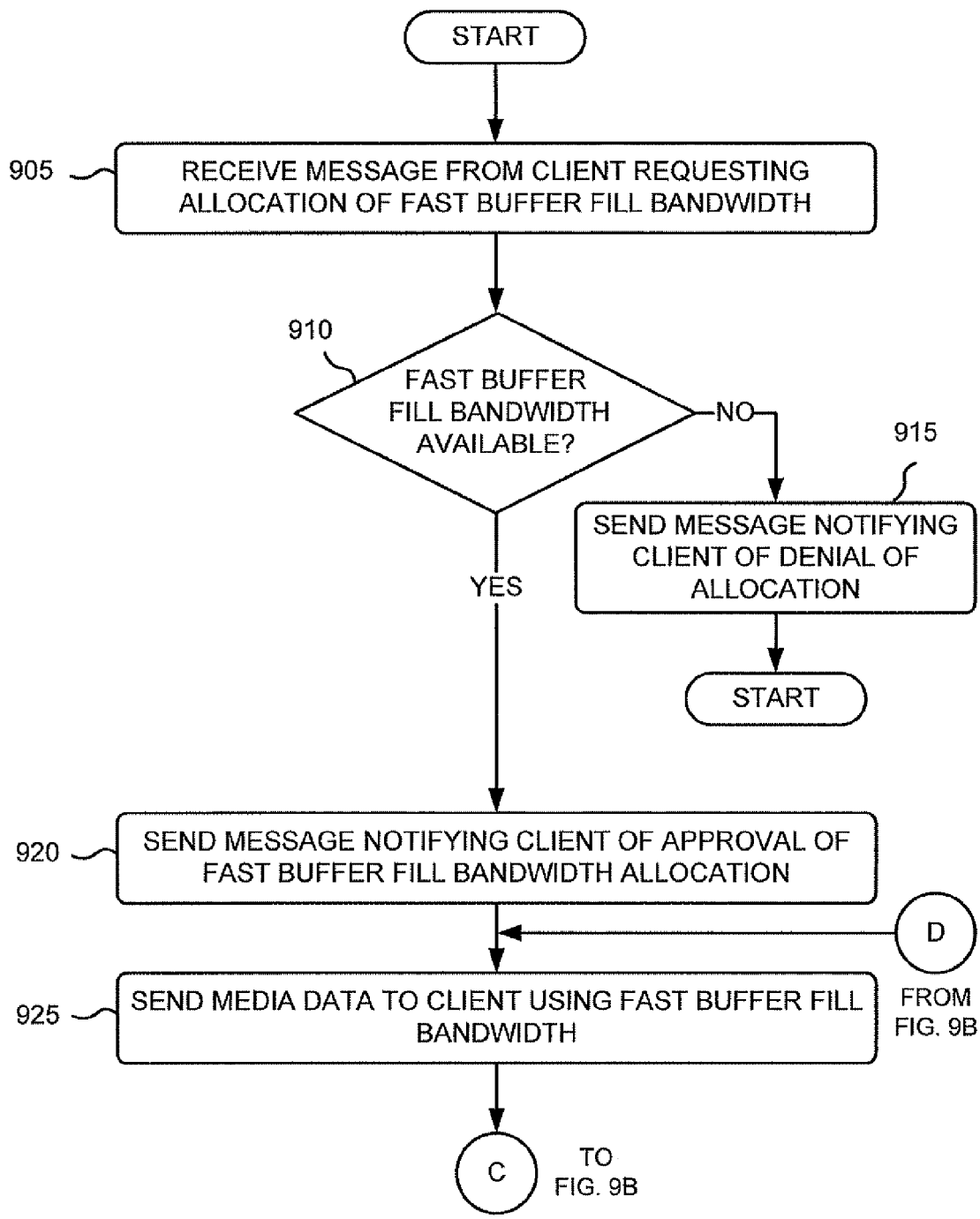
FIGS. 9A and 9B are flow charts that illustrate a process for allocating fast buffer fill bandwidth for transmission of media data according to an exemplary implementation.
Figure 9B:
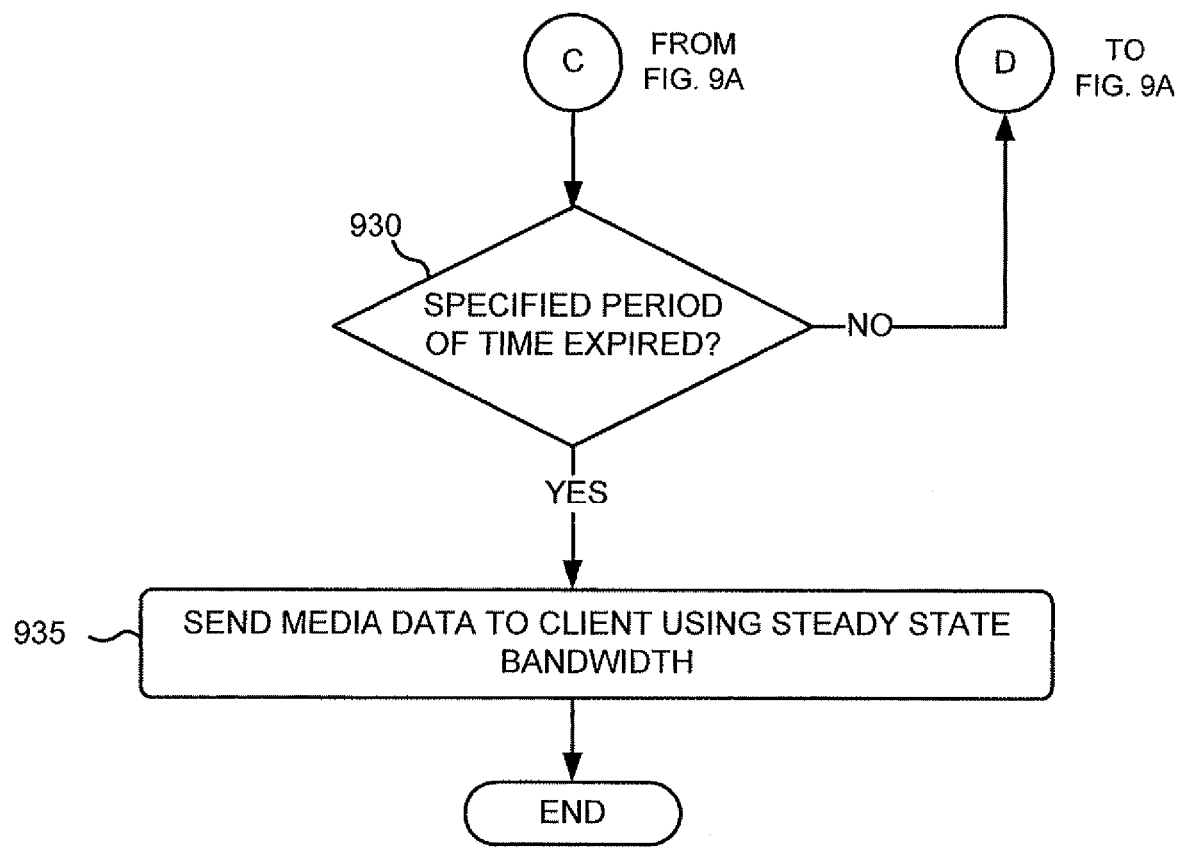

FIGS. 9A and 9B are a flowchart of a process for allocating fast buffer fill bandwidth 110 for transmission of streaming media data 120 according to an exemplary implementation. Media server 100 may implement the process exemplified by FIGS. 9A and 9B.

The exemplary process may begin with the receipt of a message from client 210 requesting allocation of fast buffer fill bandwidth 110 (block 905). As graphically depicted in the messaging diagram of FIG. 8, media server 100 may receive fast buffer fill bandwidth request 810 from client 210.

Media server 100 may determine if fast buffer fill bandwidth 110 is available (block 910). A fraction of the capacity of sub-network 220 may be reserved (or at least portions of sub-network 220 that are the most constrained) such that one or more channels of fast buffer fill bandwidth 110 are available for use on-demand, with the remainder of the capacity of sub-network 220 being available for one or more channels of steady state bandwidth 140. The one or more channels of fast buffer fill bandwidth 110 may be re-used frequently, since at any given time only a small fraction of clients 210 may have experienced a buffer fill event (e.g., a buffer underflow event, or an initial transmission of a stream of media data that requires buffering). However, it may occur that all of the reserved capacity of sub-network 220 may be in use at the time that a given client 210 sends a fast buffer fill bandwidth request 910 to media server 100. In such a case, media server 100 may determine that fast buffer fill bandwidth 110 is currently unavailable. In one implementation, to determine whether fast buffer fill bandwidth 110 is available, media server 100 may communicate with one or more elements of sub-network 220, or with a service management system associated with sub-network 220, to negotiate a certain service level agreement (SLA) to obtain a different quality of service (e.g., a higher quality of service). Negotiation of the SLA may include requesting an explicit bandwidth reservation (e.g., a higher quality of service) or requesting a higher class of service. Availability of fast buffer fill bandwidth 110 may be determined by media server 100 based on the SLA negotiated with the one or more elements of sub-network 220 or with the service management system associated with sub-network 220.

If fast buffer fill bandwidth 110 is not available (NO—block 910), then media server 100, or other network element, may send a message notifying client 210 of a denial of allocation of fast buffer fill bandwidth 110 (block 915). If fast buffer fill bandwidth 110 is available (YES—block 910), then media server 100 may send a message notifying client 210 of the approval of fast buffer fill bandwidth allocation (block 920). As graphically depicted in the messaging diagram of FIG. 8, media server 100 may send a message 820 notifying client 210 of the allocation of fast buffer bandwidth 110 to client 210.

Media server 100 may send media data 120 to client 210 using fast buffer fill bandwidth 110 (block 925). As graphically shown in the messaging diagram of FIG. 8, media server 100 may send media data 120 to client 210 via fast buffer fill bandwidth 110. During sending of media data 120 to client 210 using fast buffer fill bandwidth 110, media server 100 may determine if a specified period of time has expired (block 930). The period of time may correspond to the specified duration ($t_{BUFFER}$) of time, or the requested data volume, for which the fast buffer fill bandwidth 110 was requested by client 210 in the request message 810. If the specified period of time has not expired (NO—block 930), then media server 100 may continue sending media data 120 to client 210 using fast buffer fill bandwidth 110 (block 925).

If the specified period of time has expired (YES—block 930), then media server 100 may send media data 120 to client 210 using steady state bandwidth 140 (block 935). As graphically illustrated in the messaging diagram of FIG. 8, media server 100 may send additional media data 120 of the stream to client 210 using steady state bandwidth 140. The remaining portions of the streaming media data 120 may be sent to client 210 from media server 100 using a lower rate via steady state bandwidth 140. Media server 100 may sent media data 120 to client 210 using steady state bandwidth 140 according to a SLA that includes a lower quality of service than the SLA negotiated above with respect to block 910.

CONCLUSION

The foregoing description of embodiments described herein provides illustration and description, but is not intended to be exhaustive or to limit the embodiments described herein to the precise form disclosed. Modifications and variations are possible in light of the above teachings or may be acquired from practice of the invention. For example, certain portions have been described as executed as instructions by one or more processing units. However, implementations, other then software implementations, may be used, including, for example, hardware implementations such as application specific integrated circuits, field programmable gate arrays, or combinations of hardware and software. While series of acts has been described in FIGS. 7A, 7B, 9A and 9B, the order of the acts may vary in other. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method, comprising:
   determining that a buffer fill event has occurred;
   sending, in response to the determining, a message requesting allocation of high bandwidth delivery of a media stream;
   setting a first buffer size, for buffering a first portion of the media stream delivered, to a first duration of time, according to a first network service level agreement,
      where the first duration of time is based on the transmission rate of the first portion of the media stream;
   setting a second buffer size, for buffering a second portion of the media stream delivered, to a second duration of time, according to a second network service level agreement,
      where the second duration of time is greater than the first duration of time,
      where the first network service level agreement comprises a better service quality than the second network service level agreement, and
      where the first buffer size is smaller than the second buffer size
   buffering the first portion of the media stream in a buffer, where the buffer has the first buffer size;
   buffering the second portion of the media stream in the buffer, where the buffer has the second buffer size;
   retrieving the buffered first and second portions of the media stream; and
   playing the first and second portions of the media stream using a media playback system.

2. The method of claim 1, where the first service level agreement is associated with a first bandwidth that is greater than a second bandwidth associated with the second service level agreement.

3. The method of claim 1, further comprising:
receiving, in response to the sending the message, a message indicating that the high bandwidth delivery has not been allocated; and
setting, in response to the receiving the message, a minimum buffer size, for buffering the media stream, to a third duration of time, the third duration of time being longer than the first duration of time.

4. The method of claim 1, where the message includes at least one of information identifying the first duration of time or information identifying an amount of data to be transmitted via the requested high bandwidth delivery.

5. The method of claim 1, further comprising:
determining whether the requested high bandwidth delivery has been allocated.

6. The method of claim 1, where, after expiration of the first duration of time, the second portion is buffered at a second transmission rate that is lower than the transmission rate of the first portion.

7. A system, comprising:
one or more devices comprising:
means for setting a first buffer size, for buffering a first portion of a media stream delivered, to a first duration of time, according to a first network service level agreement,
where the first duration of time is based on the transmission rate of the first portion of the media stream;
means for setting a second buffer size, for buffering a second portion of the media stream delivered, to a second duration of time, according to a second network service level agreement,
where the second duration of time is greater than the first duration of time,
where the first network service level agreement comprises a better service quality than the second network service level agreement, and
where the first buffer size is smaller than the second buffer size;
means for filling a buffer with the first portion of the media stream to the first buffer size;
means for filling the buffer with the second portion of the media stream to the second buffer size;
means for retrieving the first and second portions of the media stream; and
means playing the retrieved first and second portions of the media stream.

8. The system of claim 7, where the first portion is buffered at a first bandwidth and, after expiration of the first duration of time, the second portion is buffered at a second bandwidth that is lower than the first bandwidth.

9. The system of claim 7, further comprising:
means for setting a third buffer size, for buffering the media stream, to a third duration of time, the third duration of time being longer than the first duration of time; and
means for filling the buffer, with the media stream to the third buffer size, at a third transmission rate that is lower than the transmission rate of the first portion of the media stream.

10. The system of claim 7, further comprising:
means for sending a message requesting allocation of high bandwidth delivery of the media stream, where the message includes at least one of information identifying the first duration of time or information identifying an amount of data to be transmitted via the requested high bandwidth delivery.

11. The system of claim 10, further comprising:
means for determining that the requested high bandwidth delivery has been allocated.

12. The system of claim 7, further comprising:
means for determining that a buffer fill event has occurred based on at least one of an initiation of transmission of the media stream or an interruption of the media stream being received.

13. A device, comprising:
a memory to store instructions; and
a processor to execute the instructions in the memory to:
determine whether a buffer fill event has occurred,
send, based on a result of the determining, a message requesting allocation of high bandwidth delivery of a media stream,
set a first buffer size, for buffering a first portion of the media stream delivered, to a first duration of time, according to a first network service level agreement,
where the first duration of time is based on the transmission rate of the first portion of the media stream,
set a second buffer size, for buffering a second portion of the media stream delivered, to a second duration of time, according to a second network service level agreement,
where the second duration of time is greater than the first duration of time,
where the first network service level agreement comprises a better service quality than the second network service level agreement, and
where the first buffer size is smaller than the second buffer size,
fill a buffer with the first portion of the media stream to the first buffer size,
fill the buffer with the second portion of the media stream to the second buffer size,
retrieve the first and second portions of the media stream, and
play the retrieved first and second portions of the media stream.

14. The device of claim 13, where the processor is further to:
determine that a buffer fill event has occurred when the buffer is determined to be empty or when the media stream, being received, is delayed.

15. The device of claim 13, where the processor is further to:
receive, in response to sending the message, a message indicating that the high bandwidth delivery has not been allocated; and
set, in response to receiving the message, a minimum buffer size, for buffering the media stream, to a third duration of time, the third duration of time being longer than the first duration of time.

16. The device of claim 13, where the processor is further to:
determine whether the requested high bandwidth delivery has been allocated.

17. The device of claim 13, where the message includes at least one of information identifying the first duration of time or information identifying an amount of the media stream to be transmitted via the requested high bandwidth delivery.

18. The device of claim 13, where, after expiration of the first duration of time, the second portion is buffered at a second transmission rate that is lower than the transmission rate of the first portion.

19. The device of claim 13, where the first service level agreement is associated with a first bandwidth that is greater than a second bandwidth associated with the second service level agreement.

* * * * *